(12) United States Patent
Jezierski, Jr.

(10) Patent No.: US 10,270,275 B2
(45) Date of Patent: Apr. 23, 2019

(54) SYSTEMS AND METHODS FOR CONTROLLING ENERGY STORAGE SYSTEMS HAVING MULTIPLE BATTERY TYPES

(71) Applicant: General Electric Company, Schenectady, NY (US)

(72) Inventor: Chester Stanley Jezierski, Jr., Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 453 days.

(21) Appl. No.: 14/837,082

(22) Filed: Aug. 27, 2015

(65) Prior Publication Data

US 2017/0063125 A1    Mar. 2, 2017

(51) Int. Cl.
    *H02J 7/00* (2006.01)
(52) U.S. Cl.
    CPC .......... *H02J 7/0073* (2013.01); *H02J 7/0021* (2013.01); *H02J 2007/0096* (2013.01)
(58) Field of Classification Search
    CPC ........................... H02J 7/0073; H02J 7/0021
    USPC ..... 320/118, 123, 158, 132–138; 307/18–29, 307/43–48, 64–68; 700/22, 286, 291, 700/295, 296, 297, 298; 702/60–65, 79
    See application file for complete search history.

(56) References Cited

U.S. PATENT DOCUMENTS

| 4,056,764 | A | 11/1977 | Endo et al. |
| 7,248,490 | B2 * | 7/2007 | Olsen .................... H02M 7/493 307/82 |
| 8,076,797 | B2 | 12/2011 | Kramer et al. |
| 2012/0169129 | A1 | 7/2012 | Kim et al. |
| 2015/0001944 | A1 * | 1/2015 | Markowz ................. H02J 3/32 307/66 |
| 2015/0050527 | A1 | 2/2015 | Jiang et al. |

FOREIGN PATENT DOCUMENTS

| EP | 1000796 | 5/2000 |
| WO | WO 2009140560 | 11/2009 |
| WO | WO 2013164638 | 11/2013 |

* cited by examiner

*Primary Examiner* — Richard V Muralidar
(74) *Attorney, Agent, or Firm* — Dority & Manning, P.A.

(57) ABSTRACT

Systems and methods for controlling an energy storage system are provided. In particular data indicative of a load profile can be received. The load profile can specify one or more amounts of power to be delivered by an energy storage system over a duration. The energy storage system can include one or more energy storage elements of a first type and one or more energy storage elements of a second type. One or more time windows associated with high power events and one or more time windows associated with high energy events can then be determined based on the load profile. Power delivery by the energy storage elements of the first type and the energy storage elements of the second type can then be controlled based at least in part on the determined time windows.

16 Claims, 7 Drawing Sheets

SYSTEMS AND METHODS FOR CONTROLLING ENERGY STORAGE SYSTEMS HAVING MULTIPLE BATTERY TYPES

FIELD OF THE INVENTION

The present subject matter relates generally to energy storage systems and more particularly, to controlling power delivery of energy storage systems having multiple energy storage element types.

BACKGROUND OF THE INVENTION

Power generation facilities can be configured to deliver various grid services for revenue generation. For instance, power generations systems, such as renewable energy plants, can be configured to respond to power demands for grid services, such as peak shaving, frequency response, ramp rate control, purchasing and selling of energy, load following, energy arbitrage, and other grid services.

Energy storage systems have become increasingly used to deliver power to utility grids either as part of standalone energy storage systems or as part of a renewable energy farm (e.g. a wind farm or solar farm) with an integrated energy storage system. Energy storage systems can include one or more battery banks or other energy storage devices that can be coupled to the grid via a suitable power converter. Energy storage systems are unique in that energy storage systems have the ability to both deliver and reserve energy for particular grid services.

In recent years, such energy storage systems have seen built to have increased storage capacity to accommodate the increased demand. For instance, some energy storage systems can store hundreds of megawatts of power using multiple energy storage devices. Conventional energy storage systems may have increased physical sizes to facilitate such increases in storage capacity. Such increased size can be inefficient and difficult to store. Accordingly, there is a need for energy storage systems having relatively smaller sizes that can meet the increasing power demands.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling an energy storage system. The method includes receiving, by one or more control devices, data indicative of a load profile specifying an amount of power to be delivered by an energy storage system over a duration. The energy storage system includes one or more first energy storage elements of a first type, and one or more second energy storage elements of a second type. The method further includes determining, by the one or more control devices, one or more first time windows in the duration when the load profile is associated with a high energy event and one or more second time windows in the duration when the load profile is associated with a high power event. The method further includes controlling, by the one or more control devices, power to be delivered by the energy storage system based at least in part on the one or more first time windows and the one or more second time windows.

Another example aspect of the present disclosure is directed to an energy storage system including one or more first energy storage elements of a first type, one or more second energy storage elements of a second type, and a system controller communicatively coupled to the one or more first energy storage elements and the one or more second energy storage elements. The system controller includes at least one processor and a non-transitory computer-readable medium storing instructions that, when executed by the at least one processor, cause the system controller to perform operations. The operations include receiving data indicative of a load profile specifying an amount of power to be delivered by the energy storage system over a duration. The operations further include determining one or more first time windows in the duration when the load profile is associated with a high energy event and one or more second time windows in the duration when the load profile is associated with a high power event. The operations further include controlling power delivery by the energy storage system based at least in part on the one or more first time windows and the one or more second time windows.

Yet another example aspect of the present disclosure is directed to a system controller for controlling one or more first energy storage elements of a first type and one or more second energy storage elements of a second type in an energy storage system. The system controller includes at least one processor and a non-transitory computer-readable medium storing instructions that, when executed by the at least one processor, cause the system controller to perform operations. The operations include receiving data indicative of a load profile specifying an amount of power to be delivered by the energy storage system over a duration. The operations further include determining one or more first time windows in the duration when the load profile is associated with a high energy event and one or more second time windows in the duration when the load profile is associated with a high power event. The operations further include controlling power delivery by the energy storage system based at least in part on the one or more first time windows and the one or more second time windows.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
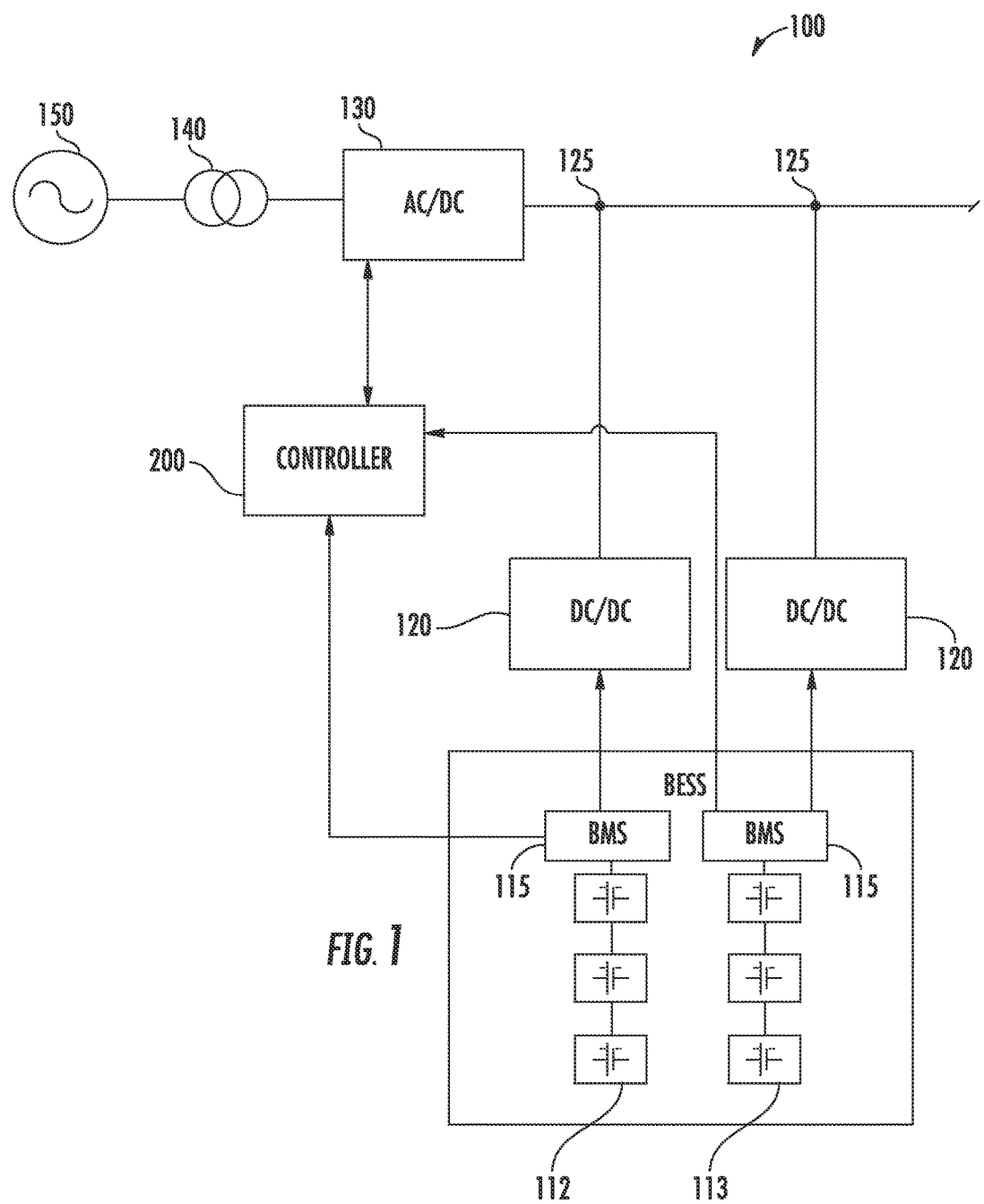
FIG. 1 depicts an example energy storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods of controlling power delivery of an energy storage system having multiple types of energy storage elements. More particularly, an energy storage system can include one or more energy storage elements of a first chemistry type and one or more energy storage elements of a second chemistry type. For instance, the energy storage system can include one or more molten salt battery devices (e.g. sodium nickel chloride, sodium aluminum chloride, sodium sulfur, etc.) and one or more lithium-ion battery devices (e.g. lithium manganese oxide, lithium cobalt oxide, lithium nickel manganese cobalt oxide, lithium iron phosphate, etc.). It will be appreciated that various other suitable battery types can be used without deviating from the scope of the present disclosure.

In example embodiments, power delivery of the energy storage system can be controlled based at least in part on a load profile associated with a power demand. The load profile can specify one or more amounts of power to be delivered by the energy storage system over a duration. In particular, the load profile can specify high energy events, and/or high power events associated with the power demand. In example embodiments, high energy events can be events wherein the amount of watt-hours to be delivered is above an energy threshold. Similarly, high power events can be events wherein the amount of watts to be delivered is above a power threshold.

Power delivery can be controlled to reduce a total amount of volume and energy required to meet the load profile by coordinating the distribution of power to be delivered by each energy storage element type based at least in part on a load profile associated with the load application. Different types of energy storage elements perform differently under different operating conditions. The efficiency of an energy storage element in meeting a power demand can depend at least in part on the energy density, power density, discharge rate, charge rate, and/or total recharge time of the energy storage element. For instance, molten salt battery devices generally perform more efficiently in meeting a high energy demand (e.g. large amount of watt-hours) than lithium-ion battery devices. Conversely, lithium-ion battery devices generally perform more efficiently in meeting a high power demand (e.g. large amount of watts) than molten salt battery devices.

Accordingly, in embodiments wherein one or more lithium-ion battery devices are combined with one or more molten salt battery devices in an energy storage system, the one or more molten salt battery devices can be controlled to deliver more power than the one or more lithium-ion battery devices when a power demand associated with the energy storage system includes a larger amount of energy, and the one or more lithium-ion battery devices can be controlled to deliver more power than the one or more molten salt battery devices when the power demand includes a larger amount of power. It will be appreciated that in embodiments wherein other energy storage element types are used, power delivery can be controlled based at least in part on the efficiencies of such other energy storage elements in various applications.

Power delivery can further be controlled based at least in part on one or more feedback signals associated with the energy storage system. The one or more feedback signals can be indicative of one or more operating parameters. In example embodiments, the one or more operating parameters can include states of charge, temperature, charge or discharge currents, and/or terminal voltages associated with the energy storage system. The operating parameters can be determined at least in part by one or more current, voltage, and/or temperature sensors configured to monitor one or more signals associated with the energy storage system.

For instance, in a particular implementation, power delivery of an energy storage system can be controlled such that energy storage elements having higher states of charge deliver more power than energy storage elements having lower states of charge. As indicated above, energy storage elements having different chemistry types can have different charge and/or discharge rates. For instance, molten salt battery devices can have a sustained charge and discharge rate of about 0.5 C, and lithium-ion battery devices can have a sustained charge and discharge rate of about 3 C. As used herein, the term "about," when used in reference to a numerical value can refer to within 40% of the numerical value. Accordingly, molten salt battery devices may require a longer amount of time to fully recharge relative to lithium-ion battery devices. In this regard, a state of charge of the energy storage elements can be monitored and, in instances wherein one or more energy storage elements have a state of charge below a threshold, such energy storage elements can be controlled to deliver relatively less power to accommodate for such low states of charge.

As another example, different energy storage elements may operate differently in different temperatures. In this regard, temperature of the energy storage elements in an energy storage system can be monitored, and energy storage elements having temperatures above a temperature threshold can be controlled to deliver relatively less power than energy storage elements having temperatures below the threshold.

With reference now to the Figures, example embodiments of the present disclosure will now be discussed in detail. FIG. 1 depicts an example power system 100 that includes an energy storage system 110 according to example aspects of the present disclosure. The power system 100 can be a standalone power generation system or can be implemented as part of a renewable energy system, such as wind farm or solar farm.

The power system 100 can include a battery energy storage system (BESS) 110. The BESS 110 can include one or more battery energy storage devices, such battery cells or battery packs. The battery energy storage devices can contain one or more molten salt battery devices 112. Molten salt battery devices 112 can include sodium nickel chloride battery devices, sodium aluminum chloride battery devices, and/or sodium sulfur battery devices. The battery energy storage devices can further include one or more lithium-ion battery devices 113. Lithium-ion battery devices 113 can include lithium manganese oxide battery devices, lithium cobalt oxide battery devices, lithium nickel manganese cobalt oxide battery devices, and/or lithium iron phosphate battery devices. It will be appreciated that BESS 110 can further include various other suitable energy storage devices, such as nickel metal hydride battery devices, or other similar devices.

The BESS 110 can include battery management systems (BMS) 115. The BMS 115 can include one or more electronic devices that monitor a battery energy storage device (e.g. battery energy storage devices 112 and 113), such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, each BMS 115 is configured to monitor and/or control operation of an energy storage device. Each BMS 115 can be, for example, a logic controller implemented purely in hardware, a firmware-programmable digital signal processor, or a programmable processor-based software-controlled computer.

The BESS 110 can be coupled to DC to DC converters 120. In particular, each battery energy storage device can be coupled to a DC to DC converter 120. Each DC to DC converter 120 can be a buck converter, boost converter, or buck/boost converter. Each DC to DC converter 120 can convert a DC voltage at the DC bus 125 to a suitable DC voltage for providing power to or receiving power from the BESS 110. The DC busses 125 can be standalone DC busses between the DC to DC converters 120 and the inverter 130. Alternatively, the DC busses 125 can be DC busses of a two-stage power converter used to convert energy from a renewable energy source to suitable power for the AC grid 150.

The DC to DC converters can include one or more electronic switching elements, such as insulated gate bipolar transistors (IGBT). The electronic switching elements can be controlled (e.g. using pulse width modulation) to charge or to discharge the battery energy storage system 110. In addition, the electronic switching elements can be controlled to condition DC power received or provided to the BESS 115.

The power system can further include an inverter 130. The inverter 130 can be configured to convert DC power on the DC busses 125 to suitable AC power for application to utility grid 150 (e.g. 50 Hz or 60 Hz AC power). The inverter 130 can include one or more electronic switching elements, such as IGBTs. The electronic switching elements can be controlled (e.g. using pulse width modulation) to convert the DC power on the DC bus to suitable AC power for the grid 150. The inverter 130 can provide AC power to the grid 150 through a suitable transformer 140 and various other devices, such as switches, relays, contactors, etc. used for protection of the power system 100.

Figure 2:
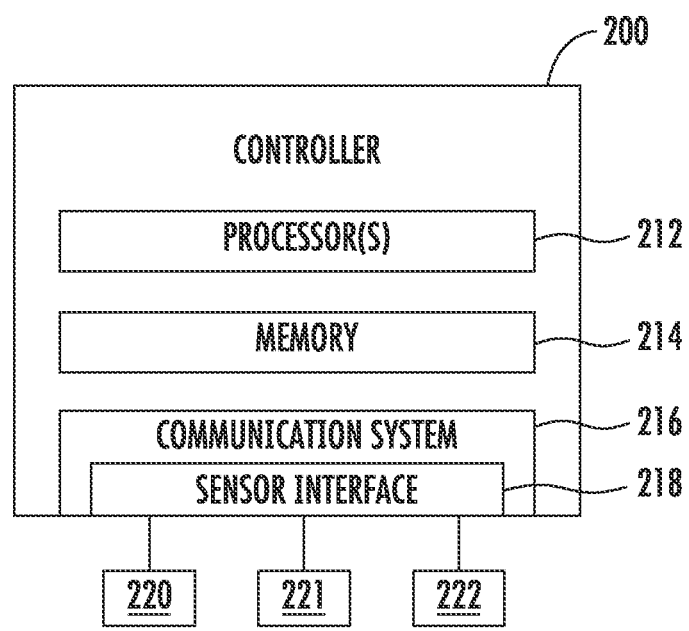
FIG. 2 depicts aspects of an example controller according to example embodiments of the present disclosure.

The power system 100 can also include a controller 200 that is configured to monitor and/or control various aspects of the power system 100 as shown in FIGS. 1 and 2. For example, the controller 200 can be configured to control power distribution of the energy storage system in response to a power demand according to example aspects of the present disclosure discussed herein. In accordance with various embodiments, the controller 200 can be a separate unit (as shown) or can be part of at least one BMS 115 of the BESS 110.

Referring particularly to FIG. 2, the controller 200 can have any number of suitable control devices. The controller 200 can be a farm level controller or a controller of one or more individual BESS 110. As shown, for example, the controller 200 can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure.

Additionally, the controller 200 can include a communications system 216 to facilitate communications between the controller 200 and the various components of the system 100. Further, the communications module 216 can include a sensor interface 218 (e.g., one or more analog-to-digital converters) to permit signals transmitted from one or more sensors 220, 221, 222 to be converted into signals that can be understood and processed by the processors 212. It should be appreciated that the sensors (e.g. sensors 220, 221, 222) can be communicatively coupled to the communications module 218 using any suitable means, such as a wired or wireless connection. The signals can be communicated using any suitable communications protocol.

As such, the processor(s) 212 can be configured to receive one or more signals from the sensors 220-222. For instance, the processor(s) 212 can receive signals indicative of the state of charge of the energy storage system from sensor 220, such as a monitoring device configured to monitor a state of charge of the energy storage devices in the energy storage system. As another example, the processor(s) 212 can receive signals indicative of power delivery (e.g. amount of power charging/discharging) from sensor 222.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 212 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the controller 200 to perform the various functions as described herein.

Figure 3:
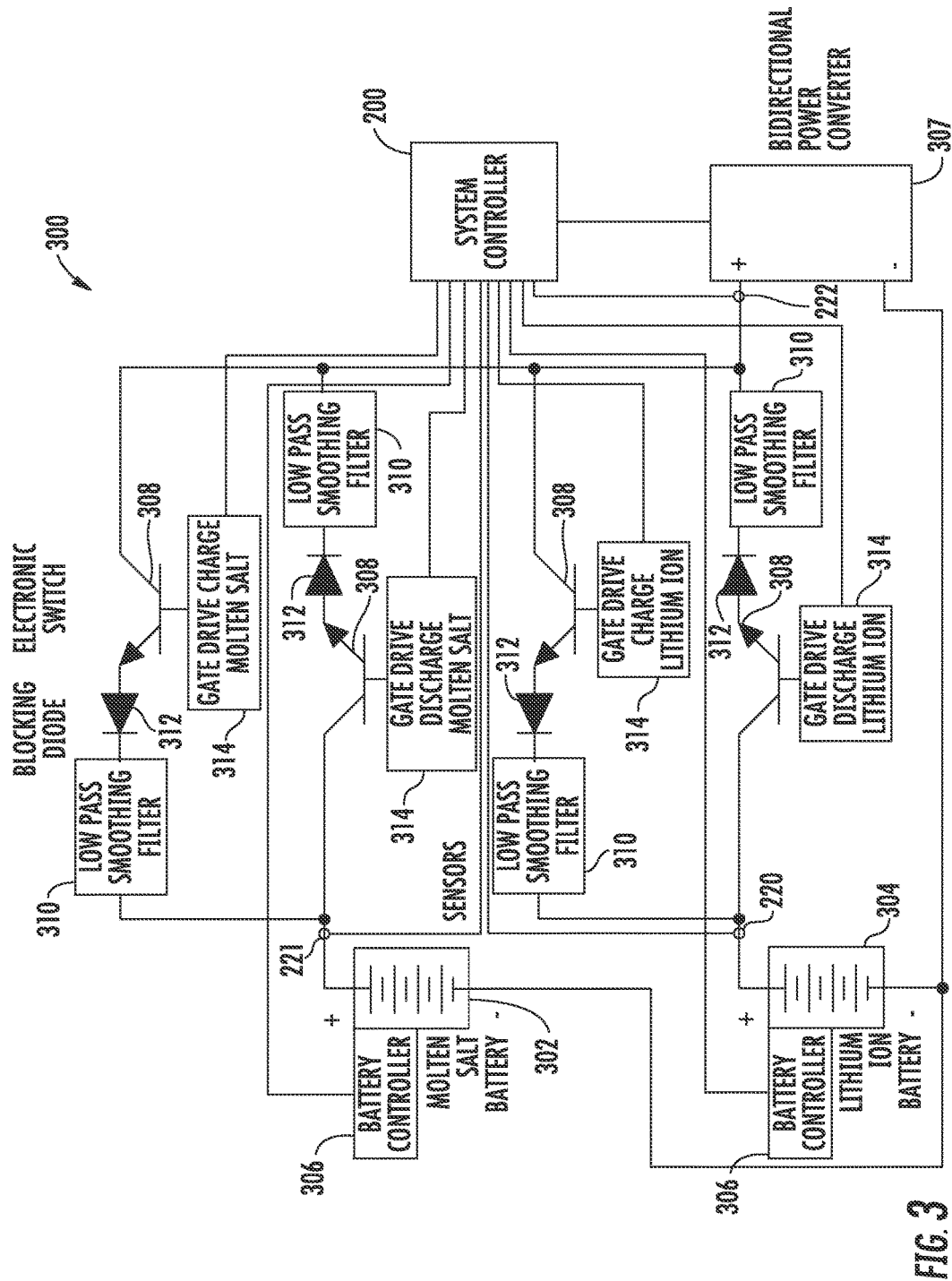
FIGS. 3-5 depict example energy storage systems according to example embodiments of the present disclosure.

FIG. 3 depicts an example system 300 for controlling the power delivery of an energy storage system according to example embodiments of the present disclosure. System 300 can include one or more molten salt battery devices 302 and one or more lithium-ion battery devices 304, which each include a corresponding battery controller 306. In example embodiments, battery controllers 306 can correspond to BMS 115 of FIG. 1, or other suitable control device(s). System 300 can further include a power converter 307. As depicted in FIG. 3, power converter 307 can be a bidirectional power converter. However, it will be appreciated that one or more unidirectional power converters can also be used without deviating from the scope of the present disclosure.

Figure 4:
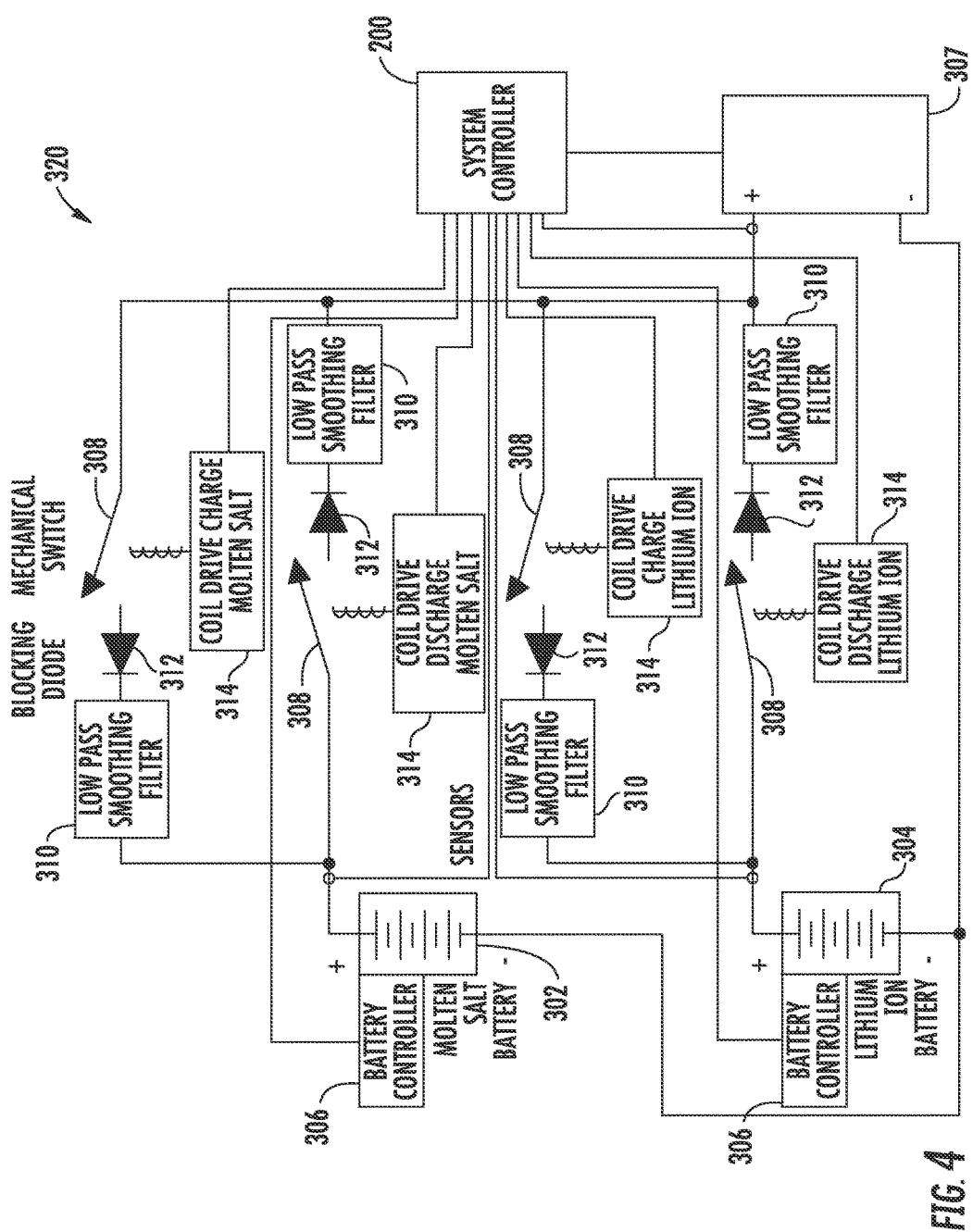
Figure 5:
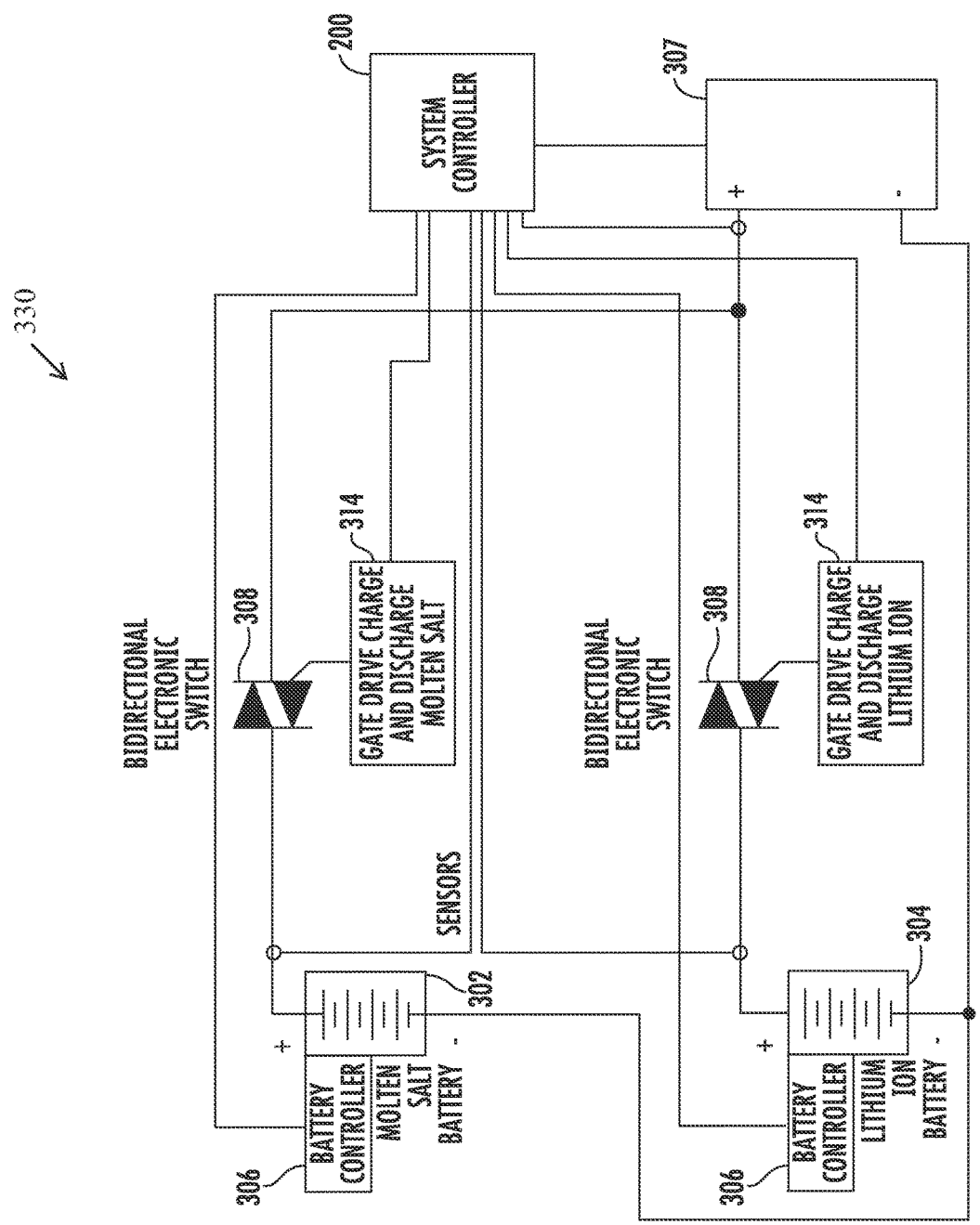

Each battery device 302, 304 can be coupled to one or more switching elements 308 that can be configured to regulate charge and/or discharge current associated with the respective battery devices. The one or more switching elements 308 can include electronic switches, mechanical switches, and/or electromechanical switches. For instance, as depicted in FIG. 3, one or more MOSFET transistors can be used to regulate the charge and/or discharge currents of battery devices 302, 304. In alternative embodiments, one or more IGBTs, MOS controlled thyristors, gate turn off thyristors, bidirectional control thyristors, contactors, and/or relays can be used to regulate the charge and discharge currents of battery devices 302, 304. For instance, FIG. 4 depicts an example system 320 for controlling the power delivery of an energy storage system according to example embodiments of the present disclosure. System 320 can correspond to system 300 wherein the switching elements 308 are mechanical switches (e.g. contactors and/or relays). As another example, FIG. 5 depicts an example system 330 for controlling the power delivery of an energy storage system according to example embodiments of the present disclosure. In system 330, switching elements 308 are bidirectional control thyristors. Each bidirectional control thyristor can be used to regulate both charge and discharge current associated with a battery device. In this manner, only one bidirectional control thyristor is needed for each battery device.

As depicted in FIGS. 3 and 4, switching elements 308 can be further coupled to one or more low pass filters 310 and blocking diodes 312. Switching elements 308 can be further coupled to one or more drivers 314. Drivers 314 can be configured to selectively control switching elements 308 based at least in part on one or more control commands provided by a system controller 200. The one or more control commands can be determined based at least in part on a load profile associated with a power demand. In example embodiments, the one or more control commands can further be determined based at least in part on one or more feedback signals provided by sensors 220-222. In a particular example implementation, the control commands can be implemented using one or more controllers (e.g. battery controllers 306 and/or system controller 200). In another example implementation, the control commands can be implemented at least in part using one or more autonomous hardware controllers (not shown). The autonomous hardware controller(s) can implement control commands using electronic and/or electromechanical components (e.g. switching elements 308 and/or other components such as one or more voltage dividers and/or zener diodes). In particular, the autonomous hardware controller(s) can implement the control commands without the use of a processor or software instructions. In this manner, the timing of the control commands can be controlled more precisely and accurately. In particular, the control commands can be generated responsive to one or more inputs from sensors 220-222 and used to control switching elements 308 in accordance with autonomous hardware control techniques.

In example embodiments, each driver 314 can control a switching element 308 using digital techniques, such as pulse width modulation, or analog techniques such as hard on-off switching, variable linear region modulation, stepped pull-in/hold switching and/or various other suitable techniques.

Figure 6:
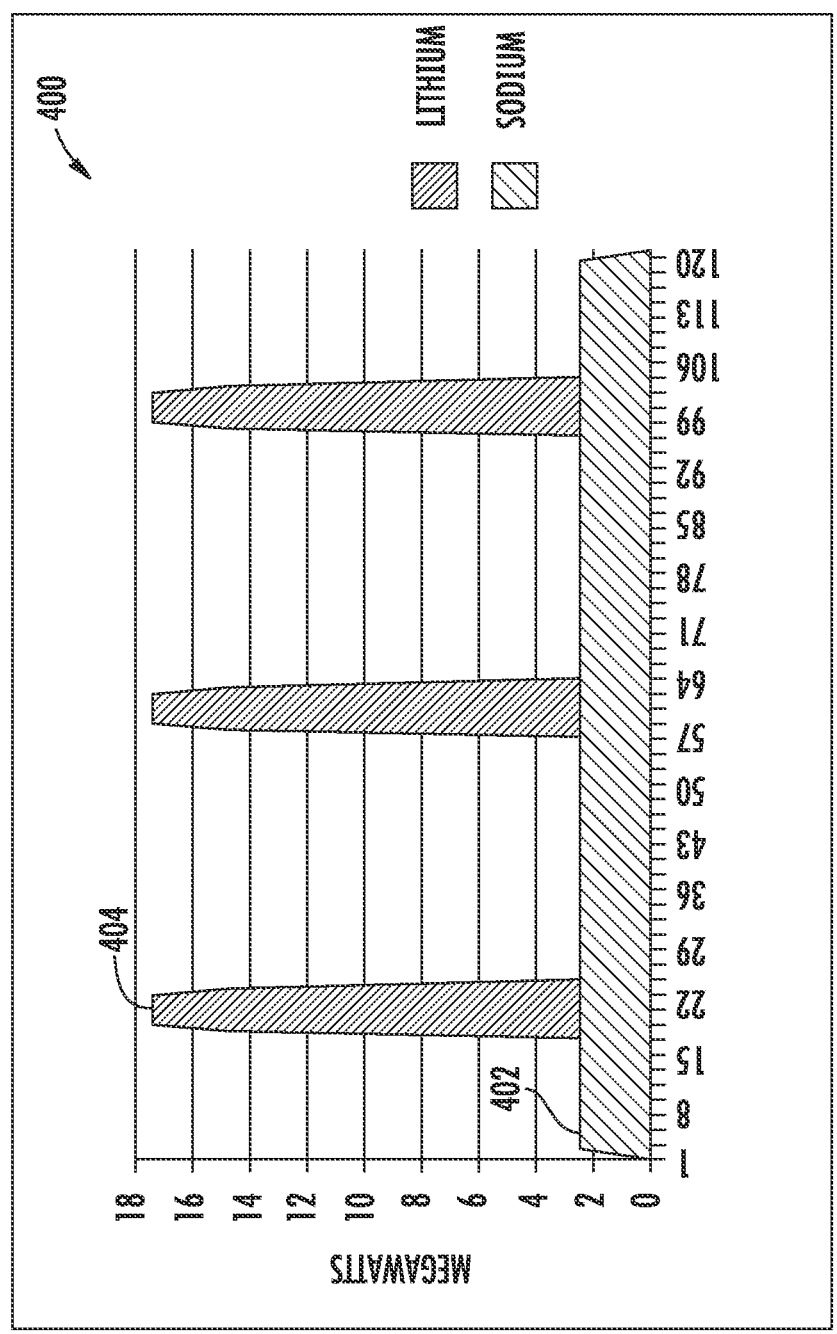
FIG. 6 depicts a plot of an example load profile according to example embodiments of the present disclosure.

FIG. 6 depicts a plot of an example load profile 400 associated with a power demand according to example embodiments of the present disclosure. Load profile 400 can specify one or more amounts of power to be delivered by an energy storage system, and a duration for which to deliver the one or more amounts of power. Load profile 400 can include high energy events 402 and high power events 404. High energy events 402 and high power events 404 can be associated with one or more amounts of power to be delivered over a two hour time period. For instance, as depicted, high energy events 402 correspond to about 2.5 megawatts (MW) for a longer duration relative to high power events 404, which correspond to about 17.5 MW for a shorter duration.

According to example embodiments, power distribution associated with an energy storage system can be controlled using one or more lithium-ion battery devices and one or more molten salt battery devices (e.g. sodium battery devices) based at least in part on the load profile. In particular, the power delivery of the two battery types can be coordinated based at least in part on an amount of power specified by load profile 400. For instance, the one or more molten salt battery devices can be controlled to deliver more power than the one or more lithium-ion battery devices when the required amount of watt-hours (e.g. energy) is greater than an energy threshold (e.g. during high energy events 402). In this manner, the molten salt battery devices can be controlled to deliver an amount of power for a specified duration. For instance, as depicted, the molten salt battery devices can be controlled to deliver about 2.5 MW of power for the entire two hour duration associated with load profile 400.

The one or more lithium-ion battery devices can then be controlled to deliver more power than the molten salt battery devices when the amount of power specified in load profile 400 is greater than a power threshold (e.g. during high power events 404). In this manner, the one or more lithium-ion battery devices can be controlled to deliver an amount of power corresponding to the difference between the amount of power specified in load profile 400 and the amount of power being delivered by the molten salt battery devices.

For instance, when the high energy events 402 are specified in load profile 400, power distribution of the energy storage system can be controlled such that the one or more molten salt battery devices deliver the entire amount of specified power (e.g. 2.5 MW), and that the one or more lithium-ion battery devices deliver no power. When high power events 404 are specified in load profile 400, power distribution of the energy storage system can be controlled such that the one or more molten salt battery devices deliver 2.5 MW, and the one or more lithium-ion battery devices deliver the remaining amount of power (e.g. 17.5 MW−2.5 MW=15 MW).

It will be appreciated that various other suitable load profiles may be used specifying various other amounts of power to be delivered over various other durations. In this manner, power distribution can be controlled based at least in part on such load profiles. For instance, controlling power distribution in accordance with some load profiles may cause the molten salt battery devices to deliver power during high energy events 402.

In example embodiments, power can further be distributed and/or redistributed based at least in part on one or more operating parameters associated with the energy storage system. For instance, power can be distributed or redistributed based at least in part on an identified temperature of the battery devices. For instance, if the distribution of power to meet load profile 400 causes one or more of the battery devices to operate at a temperature greater than a temperature threshold, power can be redistributed among the energy storage system such that the battery devices operating at the temperature greater than the temperature threshold deliver less power to reduce the temperature of such battery devices. In this manner, one or more battery devices operating at a temperature less than the threshold can compensate for the reduced power delivery of the one or more battery devices operating at a temperature greater than the temperature threshold by delivering more power to meet the amount of power specified in load profile 400.

In further embodiments, power can further be distributed based at least in part on identified states of charge associated with the battery devices. In this manner, if the distribution of power to meet load profile 400 causes the state of charge of one or more battery devices to fall below a state of charge threshold, power can be redistributed such that battery devices having states of charge greater than the threshold deliver more power relative to battery devices having states of charge less than the threshold. One or more of the battery devices having states of charge greater than the threshold can then compensate for the reduced power delivery of the one or more battery devices having states of charge less than the threshold by delivering more power to meet the power specified in load profile 400. For instance, if one or more molten salt battery devices have a state of charge that is less than the state of charge threshold, power can be distributed such that each of the one or more molten salt battery devices having states of charge lower than the threshold deliver less power based at least in part on the state of charge. One or more lithium-ion or molten salt battery devices having states of charge greater than the threshold can then be controlled to deliver more power to compensate for the lower power output of the molten salt battery devices.

In embodiments wherein multiple battery devices of each chemistry type are used, power can be distributed among each battery type in a number of manners. For instance, power can be distributed evenly, such that each battery device having the same chemistry type delivers an equal amount of power. As another example, power can be distributed based on temperature, such that one or more battery devices operating at a temperature greater than a threshold deliver relatively less power to reduce the temperature. As yet another example, power can be delivered among each battery device having the same chemistry based on identified states of charge of each battery device. For instance, power can be distributed such that more power is delivered by battery devices having a greater state of charge. In further embodiments, power can be distributed to bring the difference between the states of charge of each battery device having the same chemistry to a desired level.

Figure 7:
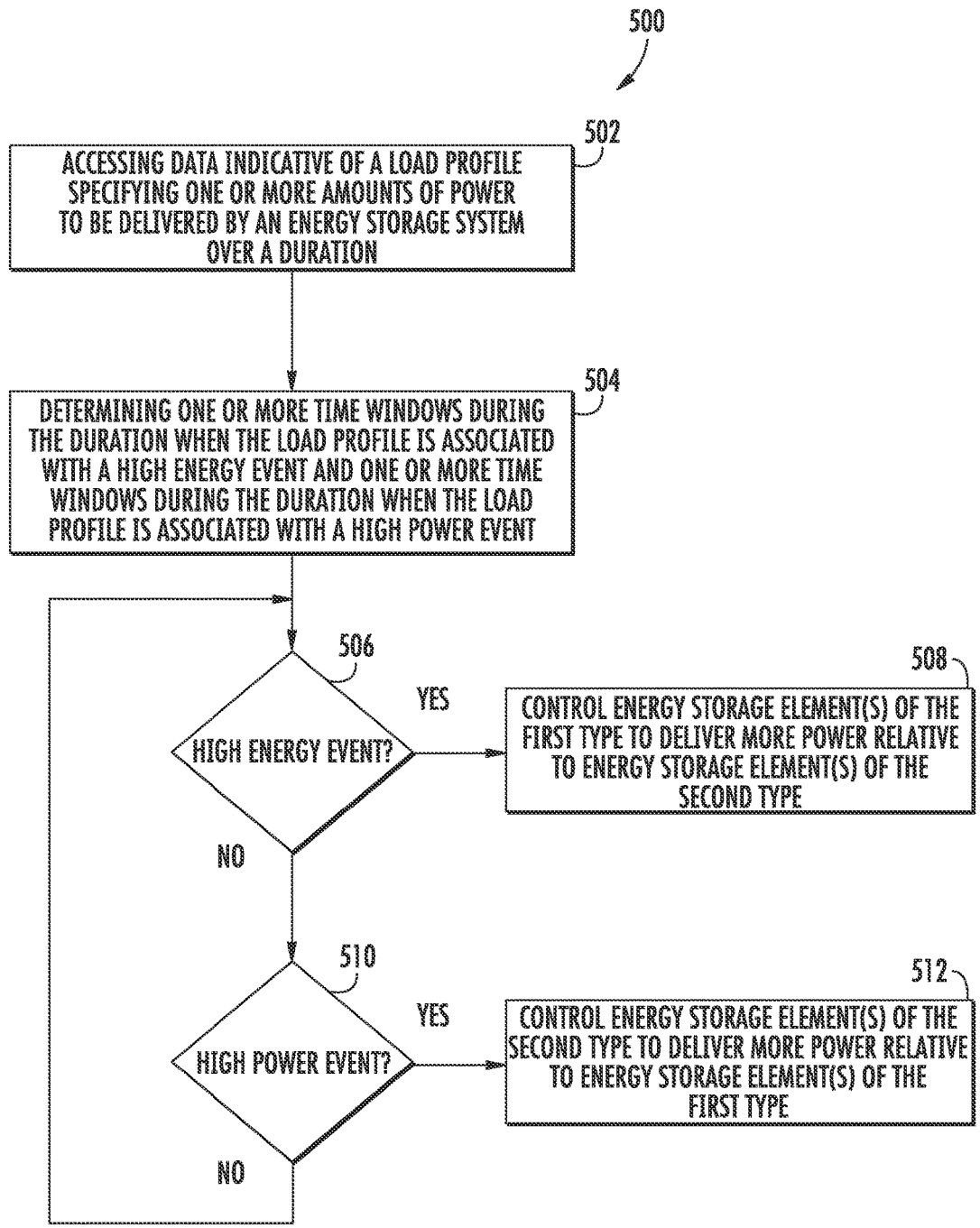
FIG. 7 depicts a flow diagram of an example method of controlling power delivery by an energy storage system according to example embodiments of the present disclosure.

FIG. 7 depicts a flow diagram of an example method (500) of controlling the power delivery of an energy storage system having energy storage elements with multiple chemistry types according to example embodiments of the present disclosure. The method (500) can be implemented by any suitable control device, such as one or more of the control devices discussed with reference to FIGS. 1-5. In addition, FIG. 7 depicts steps performed in a particular order for purposes of illustration and discussion. Those of ordinary skill in the art, using the disclosures provided herein, will understand that the steps of any of the methods disclosed herein can be modified, adapted, rearranged, omitted, and/or expanded in various ways without deviating from the scope of the present disclosure.

At (502), method (500) can include receiving data indicative of a load profile associated with an energy storage system. The energy storage system can include at least one energy storage element having a first chemistry type and at least one energy storage element having a second chemistry type. For instance, as indicated above, the energy storage system can include at least one molten salt battery device and at least one lithium-ion battery device. The load profile can be associated with a power demand, for instance, from a utility grid or other source. In particular, the load profile can specify one or more amounts of power to be delivered by an energy storage system and a duration during which to deliver the one or more amounts of power.

At (504), method (500) can include determining one or more time windows within the specified duration when the load profile is associated with a high energy event and one or more time windows during the duration when the load profile is associated with a high power event. In example embodiments, a high power event can correspond to a time window when the amount of power specified in the load profile is greater than a power threshold. Similarly, a high energy event can correspond to a time window when the amount of energy required to meet the load profile is greater than an energy threshold. The power threshold and/or energy threshold can be determined based at least in part on one or more operating characteristics of the energy storage elements in the energy storage system. For instance, the one or more operating characteristics can include energy density, power density, and/or sustained charge or discharge rate associated with the energy storage elements. In this manner, the power threshold and/or energy threshold can be determined to reduce the volume of the energy storage system and/or to reduce an amount of energy required to meet a load.

At (506), method (500) can include determining whether the energy storage system is currently within a time window associated with a high energy event. If the energy storage system is in a time window associated with a high energy event, method (500) can include controlling the energy storage elements of the first type to deliver more power relative to the energy storage elements of the second type (508). In this manner, the energy storage element(s) of the first type can be controlled to deliver the entire amount of power specified in the load profile, and the energy storage element(s) of the second type can be configured to deliver no power. In alternative embodiments, the energy storage elements of the second type may be controlled to deliver some amount of power less than the amount being delivered by the energy storage elements of the first type.

If the energy storage system is not in a time window associated with a high energy event, method (500) can include determining whether the energy storage system is in a time window associated with a high power event (510). If the energy storage system is in a time window associated with a high power event, method (500) can include controlling the energy storage element(s) of the second type to deliver more power relative to the energy storage element(s) of the first type (512). For instance, the energy storage elements of the second type can be controlled to deliver an amount of power corresponding to the difference between the amount of power specified in the load profile and the amount of power being delivered by the energy storage elements of the first type. As depicted, subsequent to (512), method 500 can return to (506).

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling an energy storage system, the method comprising:
    receiving, by one or more control devices, data indicative of a load profile specifying an amount of power to be delivered by an energy storage system over a duration, the energy storage system comprising one or more batteries of a first type and one or more batteries of a second type;
    determining, by the one or more control devices, one or more first time windows in the duration when the load profile is associated with a high energy event and one or more second time windows in the duration when the load profile is associated with a high power event, wherein the high power event comprises a first amount of power and a second amount of power, the first amount of power being lower than a power threshold, the second amount of power being greater than the power threshold; and
    controlling, by the one or more control devices, the one or more batteries of the second type to deliver more power relative to the one or more batteries of the first type during the one or more second time windows,
    wherein a duration of the high energy event is longer relative to a duration of the high power event.

2. The method of claim 1, further comprising controlling, by the one or more control devices, the one or more batteries of the first type to deliver more power relative to the one or more batteries of the second type during the one or more first time windows.

3. The method of claim 1, wherein the one or more batteries of the first type comprise one or more molten salt batteries.

4. The method of claim 1, wherein the one or more batteries of the second type comprise one or more lithium-ion batteries.

5. The method of claim 1, wherein the energy storage system further comprises a plurality of switching elements, each switching element being selectively operable to control a charge or discharge current associated with the one or more batteries of the first type or the one or more batteries of the second type.

6. The method of claim 5, wherein the plurality of switching elements are in communication with a low pass filter.

7. The method of claim 1, further comprising controlling, by the one or more control devices, power delivery by the energy storage system based at least in part on one or more operating parameters associated with the energy storage system.

8. The method of claim 7, wherein the one or more operating parameters comprise at least one of a temperature or a state of charge associated with the one or more batteries of the first type or the one or more batteries of the second type.

9. An energy storage system comprising:
    one or more batteries of a first type;
    one or more batteries of a second type; and
    a system controller communicatively coupled to the one or more batteries of the first type and the one or more batteries of the second type, the system controller comprising at least one processor and a non-transitory computer-readable medium storing instructions that, when executed by the at least one processor, cause the system controller to perform operations, the operations comprising:
    receiving data indicative of a load profile specifying an amount of power to be delivered by the energy storage system over a duration;
    determining one or more first time windows in the duration when the load profile is associated with a high energy event and one or more second time windows in the duration when the load profile is associated with a high power event, wherein the high power event comprises a first amount of power and a second amount of power, the first amount of power being lower than a power threshold, the second amount of power being greater than the power threshold; and
    controlling the one or more batteries of the second type to deliver more power relative to the one or more batteries of the first type during the one or more second time windows,
    wherein a duration of the high energy event is longer relative to a duration of the high power event.

10. The energy storage system of claim 9, wherein the operations further comprise controlling the one or more batteries of the first type to deliver more power relative to the one or more batteries of the second type during the one or more first time windows.

11. The energy storage system of claim 9, wherein the one or more batteries of the first type comprise one or more molten salt batteries.

12. The energy storage system of claim 9, wherein the one or more batteries of the second type comprise one or more lithium-ion batteries.

13. A system controller for controlling one or more batteries of a first type in an energy storage system and one or more batteries of a second type in the energy storage system, the system controller comprising at least one processor and a non-transitory computer-readable medium storing instructions that, when executed by the at least one processor, cause the system controller to perform operations, the operations comprising:
    receiving data indicative of a load profile specifying an amount of power to be delivered by the energy storage system over a duration;
    determining one or more first time windows in the duration when the load profile is associated with a high energy event and one or more second time windows in the duration when the load profile is associated with a high power event, wherein the high power event comprises a first amount of power and a second amount of power, the first amount of power being lower than a power threshold, the second amount of power being greater than the power threshold; and
    controlling the one or more batteries of the second type to deliver more power relative to the one or more batteries of the first type during the one or more second time windows,
    wherein a duration of the high energy event is longer relative to a duration of the high power event.

14. The system controller of claim 13, wherein the operations further comprise controlling the one or more batteries of the first type to deliver more power relative to the one or more batteries of the second type during the one or more first time windows.

15. The system controller of claim 13, wherein the one or more batteries of the first type comprise one or more molten salt batteries.

16. The system controller of claim 13, wherein the one or more batteries of the second type comprise one or more lithium-ion batteries.

\* \* \* \* \*